United States Patent [19]

Resch et al.

[11] Patent Number: 4,470,001

[45] Date of Patent: Sep. 4, 1984

[54] INDUCTION MOTOR CONTROL

[75] Inventors: Robert J. Resch, Chardon; Dov Hazony, University Heights; Richard E. Berris, Jr., Cleveland Heights, all of Ohio

[73] Assignee: Cyberex, Inc., Mentor, Ohio

[21] Appl. No.: 271,981

[22] Filed: Jun. 9, 1981

[51] Int. Cl.³ ............................ H02P 7/36; H02P 1/16
[52] U.S. Cl. ....................................... 318/810; 318/778
[58] Field of Search ......................... 318/810, 807–809, 318/811, 696, 803, 798–800, 778–779, 780, 431

[56] References Cited

U.S. PATENT DOCUMENTS

| | | | |
|---|---|---|---|
| 3,670,237 | 6/1972 | Hubel | 318/431 X |
| 3,742,333 | 6/1973 | Yurick | 318/810 X |
| 4,114,073 | 9/1978 | Uzuka | 318/254 A X |
| 4,214,194 | 7/1980 | Horning | 318/696 |
| 4,251,758 | 2/1981 | Pedersen | 318/138 X |
| 4,300,084 | 11/1981 | Heeren | 318/696 |

OTHER PUBLICATIONS

Hazony, Dov, "Pulse Control in Dynamic Systems," Academic Press, Inc., pp. 75–85.

Goto, Tatsuo and Yasuharu Tamuro, "Three Phase Induction Motor Impulse Drive Method," IEEE.

Primary Examiner—J. V. Truhe
Assistant Examiner—Patrick C. Keane
Attorney, Agent, or Firm—Watts, Hoffmann, Fisher & Heinke

[57] ABSTRACT

An induction motor operating system having a pulse width modulation operating system and a time domain signal generating system.

The induction motor is operated from the time domain system to provide extremely large motor starting forces compared to the nominal motor force. Opposite ends of each of first, second and third motor windings are connected across a D.C. power supply and individual power supply. Waveforms are supplied to said respective motor windings during a predetermined brief interval. The first waveform, supplied to a first winding, is configured such that current initially flows through the first winding to establish a first magnetic field in the motor. The second and third waveforms are configured so that current is supplied to the second and third windings after establishment of the first magnetic field to establish second and third magnetic fields reacting with the first magnetic field to create a motive force acting on the moving element of the motor.

4 Claims, 7 Drawing Figures

4,470,001

INDUCTION MOTOR CONTROL

DESCRIPTION

1. Technical Field

The present invention relates to operating electric motors and more particularly to a method of operating electric induction motors constructed for energization from multiphase power supplies.

2. Background Art

Multiphase electric induction motors have individual phase windings positioned in spaced relation to each other. The motor windings are typically energized in sequence from an alternating current power supply to produce moving magnetic fields. The magnetic fields in turn produce mechanical forces which drive the moving element of the motors. Induction motors are generally rotary devices formed by a stationary "stator" which supports the windings and a rotatable "rotor." These motors are less frequently constructed as linear motors in which the stator and windings are disposed along a predetermined path and the moving element is propelled along the path. In both cases the motors are referred to as including a stator and rotor.

Heavy duty induction motors have traditionally been operated from a three-phase source of alternating current with each phase of the A.C. being provided to a respective motor winding in a sinusoidal waveform at a given frequency, e.g., 60 Hz. These waveforms are displaced 120° from each other to produce the moving magnetic fields. The A.C. waveforms provided to the windings are cyclic, symmetrical, and identical except for their displacement in time.

More recently it has become common to operate induction motors from a direct current source connected in circuit with the motor phase windings by controlled electronic switches. The switches are operated between conductive and nonconductive conditions by controller circuits to enable the flow of D.C. through the respective windings to approximate the sinusoidal waveforms produced by conventional A.C. power supplies. These induction motor driving systems thus function to operate the motors by essentially cyclic, symmetrical waveforms shifted in time relative to each other.

Conventionally operated induction motors are frequently used in applications where driving torques required by the load when the motor is started greatly exceed the nominal running torque required of the motor by the load. When such induction motors are started they produce transient torques which are larger than their rated torques. These momentarily high torques are experienced immediately after the motor is started (peaking at one half cycle after start up). If the transient torque is not sufficient to satisfy the torque requirements of the load, the motor stalls. As a consequence, induction motors are frequently selected for applications based on starting torque requirements of the load.

This tends to result in use of motors which are much more powerful than would otherwise be required to operate the load under usual running conditions. The selection of such motors generally creates higher initial costs and greater operating inefficiency than would be experienced if a motor could be selected for operating the load under normal running conditions.

Methods have been proposed for controlling operation of induction motors at extremely low speeds by the use of phase angle control techniques and to provide for stopping an induction motor at a precise location (see Goto and Tamuro, "Three-Phase Induction Motor Impulse Drive Method," I.E.E.E. Journal, 1979). These proposals have employed phase angle control circuitry for transmitting predetermined portions of an A.C. supply waveform to selected motor windings.

There are applications where an electric motor is required to operate in a stepwise fashion, i.e., the rotor moves from one predetermined position to another in one step or a succession of steps. Such motors, called stepper motors, generally have specially configured rotors and windings, are normally relatively small and do not produce high levels of torque. Typically constructed induction motors are not utilized as stepper motors.

DISCLOSURE OF INVENTION

The present invention provides a new and improved method of operating a conventionally constructed multiphase induction motor wherein the motor is capable of producing exceedingly high starting torques or forces, compared to the nominal motor torque or force, and wherein the motor can be operated through individual controllably variable steps.

In accordance with the invention an induction motor is operated to provide for extremely large starting forces compared to the nominal motor start force. A D.C. motor energizing power supply is provided and opposite ends of each of first, second and third motor windings are connected across the power supply through control circuitry. Individual power supply waveforms are supplied to the respective windings during a predetermined brief interval. A first power supply waveform, supplied to the first winding, establishes a first magnetic field in the motor. Second and third waveforms are supplied respectively to the second and third windings and are so configured that current is supplied to the second and third windings after establishment of the first magnetic field to thereby establish second and third magnetic fields for reacting with the first magnetic field and creating a motive force acting on the movable element of the motor.

In a preferred embodiment of the invention rotary induction motors are operated so that extremely large starting torques are produced. The opposite ends of the motor windings are connected across the power supply via controller circuits each comprising at least one electronic switch for enabling control of the current flow through the associated motor winding. The electronic switches are rendered conductive and nonconductive in response to asymetrical noncyclic control signal waveforms and thus energization of the motor windings is by asymetrical, noncyclic power supply waveforms.

Further in accordance with the invention multiphase induction motors are operated as stepper motors which produce large torques as they step. This is accomplished by establishing a first magnetic field in the rotor by energization of one winding, establishing currents in second and third motor windings to create magnetic fields reacting with the first field to produce a large starting torque on the rotor and thereafter providing current flows in the second and third windings for creating torque which opposes the motion of the rotor and stops the rotor at a predetermined position.

Other objects and advantages of the invention will become apparent from the following detailed description of a preferred embodiment made with reference to the accompanying drawings which form a part of the specification.

BEST MODE FOR CARRYING OUT THE INVENTION

Figure 1:
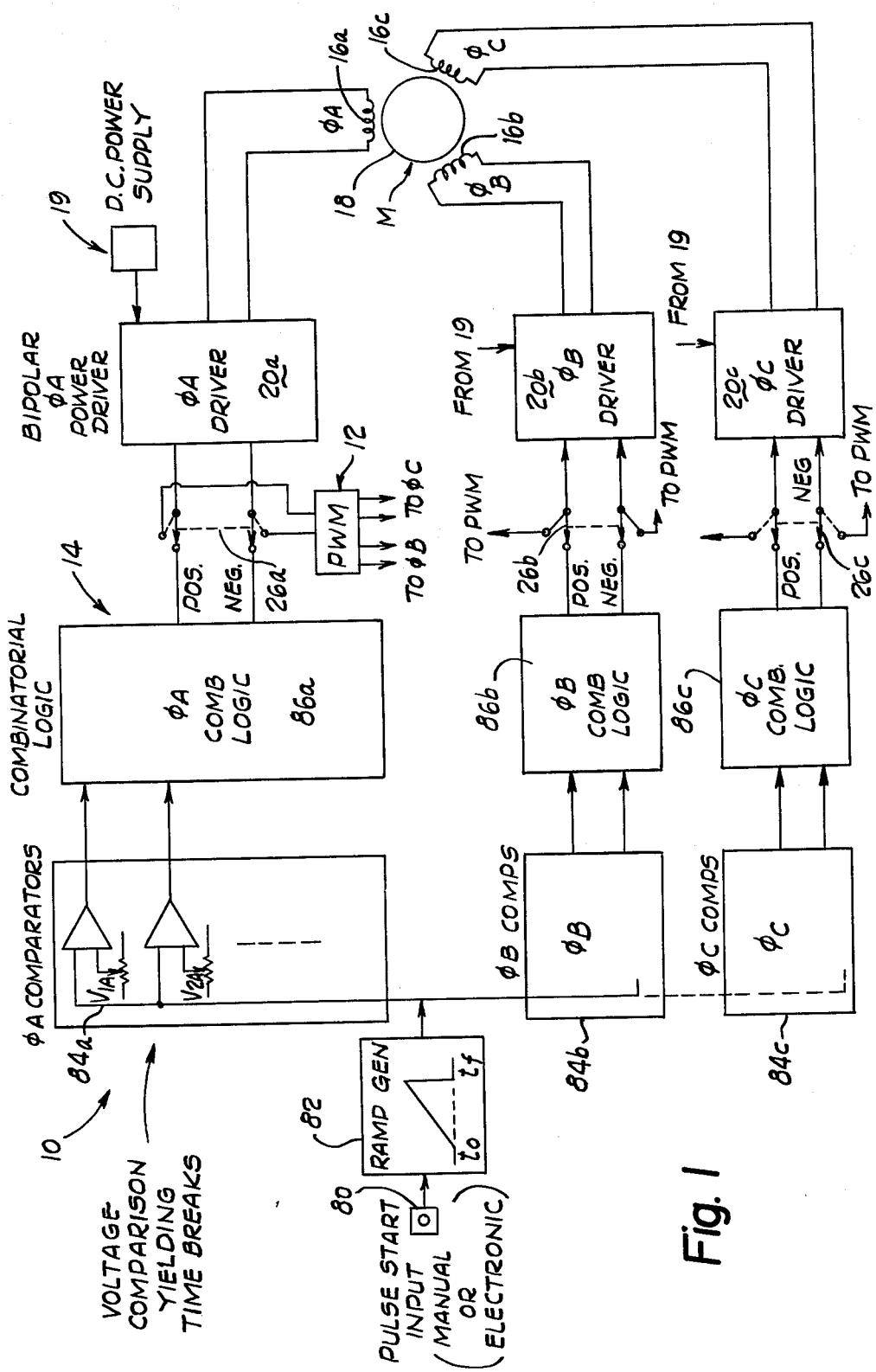
FIG. 1 is a schematic representation of an induction motor and motor controlling system embodying the present invention.

A system 10 for operating a three-phase induction motor M in accordance with the present invention is illustrated by FIG. 1 of the drawings. The system 10 is constructed and arranged for operating the motor M in a frequency domain mode, i.e., as a conventional three-phase induction motor, via a pulse width modulation system 12 and for operating in a time domain mode via a time domain pulse generating system 14. For convenience the motor phases are referred to as phases A, B and C, respectively, and identical components associated with different phases are sometimes identified with common reference numerals associated with a phase identifying letter. The motor M has first, second and third phase windings 16a, 16b, 16c, respectively, forming part of a stator construction, and a rotor 18. Each of the motor windings has its opposite ends connected across a direct current power supply 19 via an associated respective phase driver circuit 20a, 20b or 20c. Each driver circuit (FIGS. 1 and 4) is effective to connect its associated phase winding across the D.C. power supply via electronic switches operated between conductive and nonconductive conditions to control the flow and direction of current through the associated phase winding from the D.C. power supply. The driver circuits 20 are of conventional, commercially available construction. The D.C. power supply is likewise a commercially available conventional power supply preferably formed by a power inverter coupled to an A.C. supply. The inverter and associated equipment are not described and only symbolically illustrated in FIG. 4.

The phase driver circuits 20 of the system 10 are illustrated as controllable alternatively from the pulse width modulation system 12 or from the time domain pulse generating system 14 via selection switches 26a, 26b, 26c. The switches 26 are schematically illustrated as physically positionable between a first position (illustrated) in which the time domain system 14 governs operation of the phase drivers and a second position in which the pulse width modulation system 12 controls operation of the phase driver circuits.

The pulse width modulation system 12 is conventional and not described in detail or illustrated. When the motor M is driven from the pulse width modulation system 12 the motor functions as a typical three-phase induction motor in that the phase driver circuits 20a, 20b, 20c are effective to govern the supply of D.C. power to the respective phase windings in a frequency domain mode in which the D.C. power supply waveform provided to the phase windings is symmetrical and cyclic and with the waveforms supplied to the respective phase windings being identical except for the differences between their phase angles.

When the switches 26 are actuated to connect the phase driver circuits 20 to the time domain system 14, the motor M is operated in a pulsewise mode in accordance with which extremely large starting torque is imparted to the rotor 18 during one or a succession of brief intervals of energization of the motor. Motors operated experimentally in accordance with the present invention have been observed to produce starting torque magnitudes over four times greater than the nominal motor torque. The illustrated time domain system 14 is effective to operate the motor M as a stepper motor so that the rotor 18 is shifted through a predetermined angular displacement during each time domain interval of its energization from the system 14. The rotor 18 is initially moved with extremely high torque and likewise is dynamically braked by the application of opposing torque so that the rotor 18 is motionless at the end of the operating interval.

Figure 2:
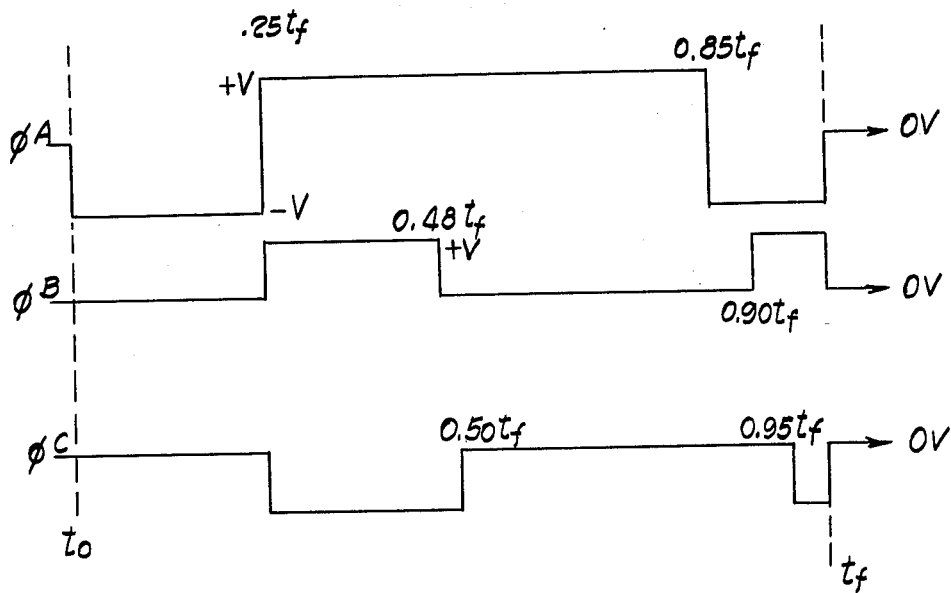
FIG. 2 is a graphic depiction of motor winding voltages produced in accordance with the invention in a motor such as that illustrated by FIG. 1.

FIG. 2 illustrates the power supply voltage waveform supplied from the driver circuits 20 to the respective associated phase windings 16a. As illustrated by FIG. 2 the power is supplied to the motor phase windings over an interval from $T_0$ $T_f$ which, in practice, can be as long as 100–200 milliseconds but is preferably on the order of 50 milliseconds. The system 14 conditions the driver circuits 20 to supply the motor M with power only during defined intervals before and after which no power is supplied to the motor M. An exemplary manner of energizing phase windings of the motor M to produce a predetermined high torque stepwise operation of the motor is illustrated by FIG. 2.

As indicated, when the time domain system 14 is rendered effective the phase A winding 16a is connected across the D.C. power supply with the current supplied to the phase winding in one direction for about 25% of the interval. The polarity is then reversed and the phase A winding is supplied with current flowing oppositely for the next 0.6 of the interval. Thereafter the polarity is again reversed until the end of the cycle at which time the phase winding 16a is disconnected from the power supply.

Energization of the phase A winding during the first 25% of the interval is effective to establish a magnetic field in the rotor 18. When this has been accomplished both the phase B and the phase C windings are supplied with currents from the power supply of opposite polarity. The phase B and phase C windings establish magnetic fields which react with the magnetic field established in the rotor 18 by the winding 16a and create a substantial starting torque exerted upon the rotor 18.

The starting torque is developed and maintained for about the first half of the interval, as a result of which the rotor 18 moves from its initial position. The phase B and phase C motor windings are then rendered nonconductive until relatively late in the interval, at which time they are again supplied with current from the power supply resulting in establishment of magnetic fields which again react with the field in the rotor. The reacting fields produce a strong torque opposing motion of the rotor. The energization of the phase B and phase C windings occurs when about 90% and 95%, respectively, of the interval has elapsed. The timing and extent of energization of these windings is selected to bring the rotor 18 to a complete stop at the end of the interval. At this juncture, of course, none of the phase windings remains conductive. Motors operated in accordance with the present invention thus are not subject to "jittering" motion, or torques, of the sort encountered in connection with frequency domain control techniques.

Figure 3:
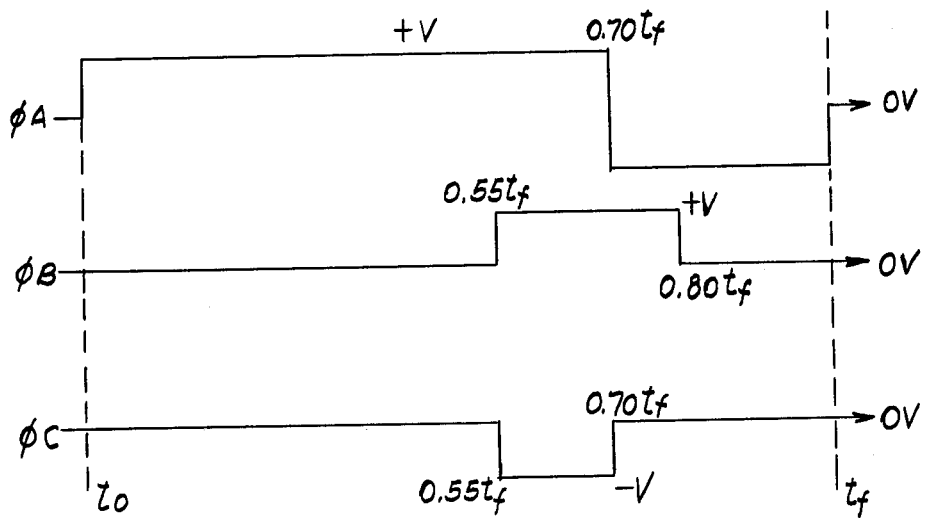
FIG. 3 is a graphic illustration of motor winding voltages provided in accordance with the invention to the windings of a wound rotor induction motor.

FIG. 3 illustrates the power supply waveforms supplied to phase windings of a wound rotor induction motor which are exemplary of waveforms utilized to operate such a motor as a stepper motor. Wound rotor induction motors are desirable for use as stepper motors because the R/L rotor time constant is controllable, thus permitting control of the time domain interval band width.

When a typical induction motor is operated as a stepper motor, the output shaft is attached to an output device which maintains the shaft position. A typical output device of the sort referred to is a ball-screw. Wound rotor induction motors have the advantage that their rotors can be electrically locked in position after stepping. This is accomplished by supplying frequency domain power (e.g. three-phase pulse width modulation power) to the motor which creates rotor torque sufficient to just balance the load torque on the motor. In such an application the wound rotor can be conditioned to function like a transformer secondary to conserve power which might otherwise be dissipated as heat.

The phase winding energizing waveform configurations illustrated by FIGS. 2 and 3 are representative of waveform configurations which have been found desirable and effective for controlling the operation of the motors referred to as stepper motors or positioners. Other waveform configurations for accomplishing the same or similar results may be determined theoretically or empirically. It should be noted that unlike frequency domain mode motor operating waveforms the power supply waveforms supplied to the individual phase windings are dissimilar one from the other, asymmetrical over the interval and noncyclical in nature.

Figure 4:
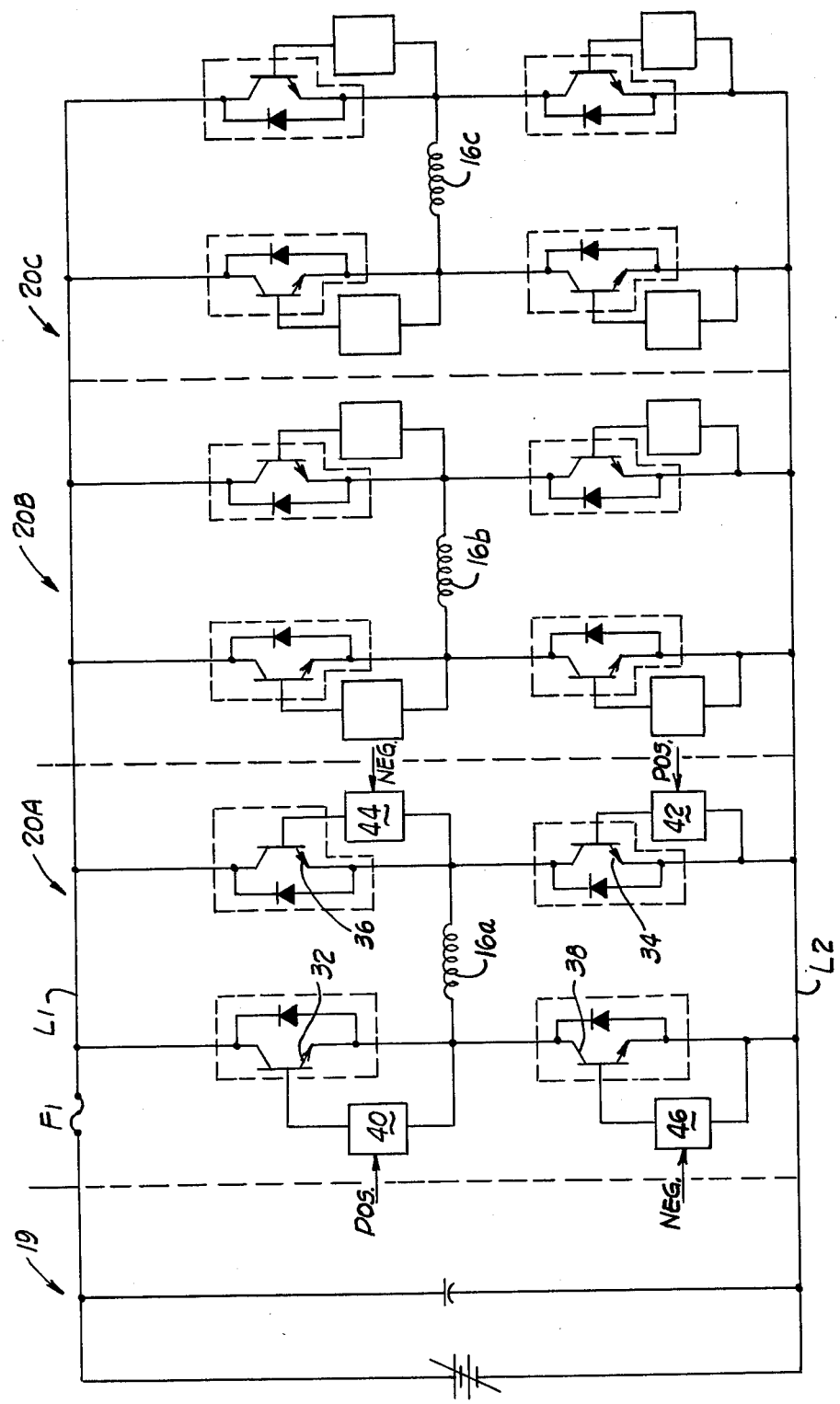
FIG. 4 is a schematic illustration of a portion of the system illustrated by FIG. 1.

FIG. 4 illustrates the construction of the driver circuits 20a, 20b, 20c for the respective phase windings. Since the driver circuits are identical, only the circuit 20a is described. Referring to FIG. 4 the phase A winding 16a has its ends connected to the power supply 19 via first and second pairs of electronic switches, illustrated as power transistors. When the power transistors 32, 34 are rendered conductive the phase winding 16a is energized from the power supply through a line L1, the collector and emitter electrodes of the transistor 32 and to a line L2 through the collector and emitter electrodes of the transistor 34. The transistors 36, 38 are always maintained in their nonconducting states when the transistors 32, 34 are conducting, and vice versa. When the power transistors 36, 38 are rendered conductive the current flow through the winding 16a is reversed and the winding is energized from the line L1 through the collector and emitter electrodes of the transistor 36 and to the line L2 through the collector and emitter electrodes of the transistor 38. In the convention utilized in the present description voltage applied across the winding 16a via the transistors 32, 34 is "positive" voltage whereas the voltage applied across the winding 16a via the transistor 36, 38 is "negative" voltage.

The transistors 32, 34 are operated between their conducting and nonconducting conditions by control circuits 40, 42, respectively, while the transistors 36, 38 are operated between their conducting and nonconducting conditions by respective control circuits 44, 46. The control circuits 40, 42 are operated substantially simultaneously by outputs from the pulse width modulation system 12 or the time domain system 14 which are generated when the positive voltage is to be applied across the winding 16a. The control circuits 44, 46 are operated in response to signals from the pulse width modulation 12 or the time domain system 14 when the negative voltage is to be applied across the field winding 16a.

Figure 5:
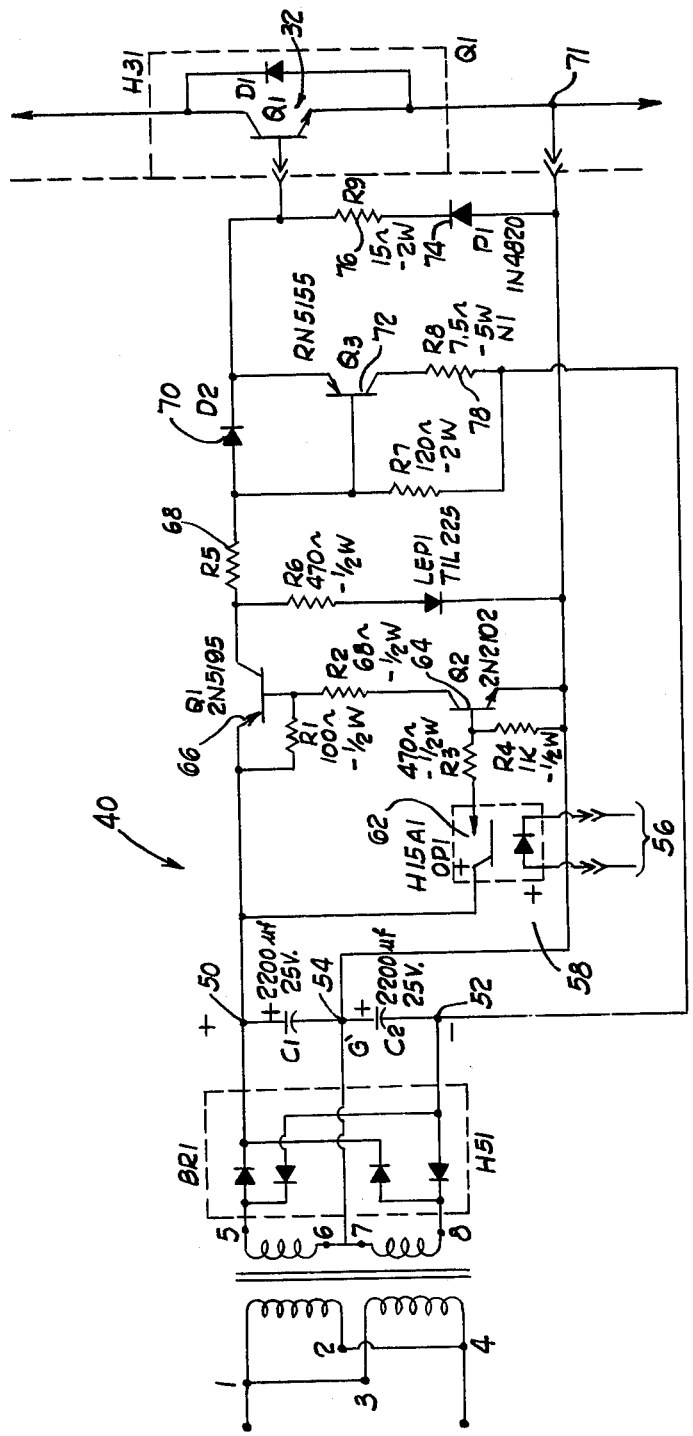
FIG. 5 is a schematic diagram of part of the circuitry illustrated by FIG. 4.

The control circuits 40, 42, 44, 46 are all identical and accordingly only the control circuit 40 is illustrated and described in connection with FIG. 5. Referring now to FIG. 5, the control circuit 40 is shown coupled to an A.C. power supply via a center tapped transformer, a full wave rectifier and filter capacitors so that the control circuit 40 is supplied with full wave rectified filtered direct current from positive, negative and neutral terminals 50, 52, 54, respectively. The control circuit 40 is coupled to the pulse width modulating system 12 or the time domain pulse generating system 14 via the switch 26a, input leads 56 and an optical isolation device 58. When a signal is input to the control circuit 40 across the leads 56, a light emitting diode is rendered conductive and maintained conductive so long as the input signal is present across it. Operation of the LED causes an associated photo responsive transistor 62 to conduct which in turns renders transistors 64, 66 conductive.

When the transistor 66 is rendered conductive, a circuit is established through its emitter and collector electrodes from the positive power supply terminal 50 through a resistor 68 diode 70, the base and emitter electrodes of the power transistor 32, and to the neutral power supply terminal 54 via a junction 71. Completion of this circuit renders the transistor 32 conductive and maintains the transistor 32 in a conductive state so long as the input signal appears across the lead 56.

When the input signal to the control circuit 40 is discontinued the transistor 62 is rendered nonconductive, resulting in the transistors 64, 66 being rendered nonconductive. Current flow through the base-emitter junction of the power transistor 32 is thus terminated. In order to assure that the power transistor 32 is promptly rendered nonconducting and is maintained nonconductive the control circuit 40 is provided with a biasing transistor 72 whose emitter and collector electrodes are connected between the neutral power supply terminal 54 and the negative power supply terminal 52 through a diode 74 and resistors 76, 78. So long as the transistor 66 remains conductive, the transistor 72 is maintained in its nonconductive condition because the forward voltage drop across the diode 70 assures that the emitter electrode of the transistor 72 remains at a lower voltage level than its base. Whenever the transistor 66 is rendered nonconductive the emitter of the transistor 72 is supplied from the neutral terminal 54 through the diode 74 and resistor 76 while the diode 70 assures that the base of the transistor 72 remains at a lower level than the emitter. Accordingly, the transistor 72 is rendered conductive resulting in the base of the power transistor 32 being maintained at a voltage level which is less than the level of the voltage at the emitter electrode of the power transistor 32 by the amount of the voltage drop across the diode 74 and resistor 76.

Figure 6:
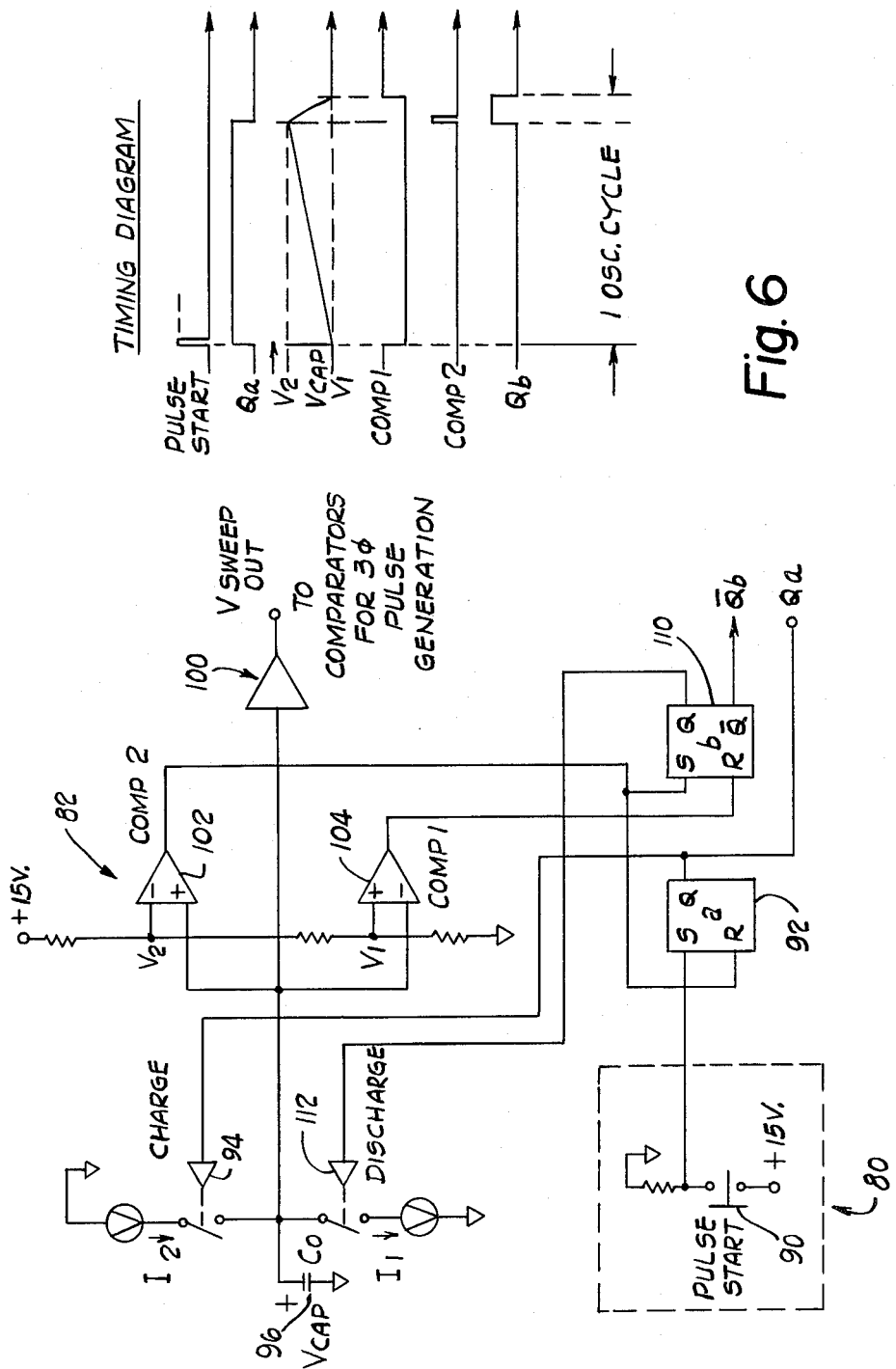
FIG. 6 is a schematic illustration of still another part of the system illustrated by FIG. 1.

Referring again to FIG. 1 of the drawings, the time domain pulse generating system 14 responds to a starting pulse to provide phase controlling signal waveforms to the respective phase driver circuits 20 during the predetermined interval. The system 14 is illustrated as having a pulse starting input device 80, a timing unit in the form of a ramp generator 82, comparator networks 84a, 84b, 84c associated with the respective motor phase components, and combinatorial logic units 86a, 86b, 86c coupled between the respective comparator networks and each associated phase driver circuit 20. FIG. 6 schematically illustrates an exemplary starting device 80 and ramp generator 82 together with a timing diagram. When a starting pulse is provided via a device 80 the ramp generator 82 functions to produce a ramp output voltage waveform whose voltage increases in magnitude relative to a reference level at a constant rate until reaching a maximum value at the end of the interval over which the system 14 provides output pulses.

The starting device 80 is illustrated as a simple mechanically actuated switch element 90 effective, when closed, to complete a circuit across a low voltage power supply and provide an input signal to the ramp generator circuit 82. The illustrated starting device could be replaced by an electronic equivalent or any other suitable mechanical switching arrangement.

The output from the pulse starting device 80 is delivered to the setting input of a set-reset flip-flop 92 causing the flip-flop to produce a positive output signal ($Q_a$). The output signal from the flip-flop 92 is delivered to a solid state relay 94 which is energized to connect a capacitor 96 in series with a source of D.C. charging current. The voltage across the capacitor increases at a predetermined rate as the capacitor charges, thus producing a ramp voltage signal. The ramp voltage signal is fed to the input of an inverter 100 which inverts the waveform and thus outputs a negative-going ramp voltage waveform, referred to as the sweep voltage, from the ramp generator 82.

The ramp voltage is also transmitted to the noninverting and inverting inputs of comparators 102, 104, respectively. When the ramp voltage reaches a predetermined level the output of the comparator 102 goes high, producing an output which is delivered to the reset terminal of the flip-flop 92. This results in the output signal $Q_a$ from the flip-flop 92 being terminated deenergizing the solid state relay 94 and thus preventing any further charging of the capacitor 96.

The output from the comparator 102 is also input to the set terminal of a set-reset flip-flop 110 resulting in an output from that flip-flop for energizing a solid state relay 112. The relay 112 is energized to discharge the capacitor 96 at a relatively rapid rate. When the capacitor has discharged to its initial precharging level the comparator 104 provides an output signal to the reset terminal of the flip-flop 110. This discontinues the noninverting output from the flip-flop 110. The flip-flop 110 has an inverting output which produces an output signal ($\overline{Q_b}$) whenever the flip-flop 110 does not produce an output from its noninverting output terminal.

The ramp generator 82 remains reset, as described, until another starting pulse is delivered from the unit 80.

Figure 7:
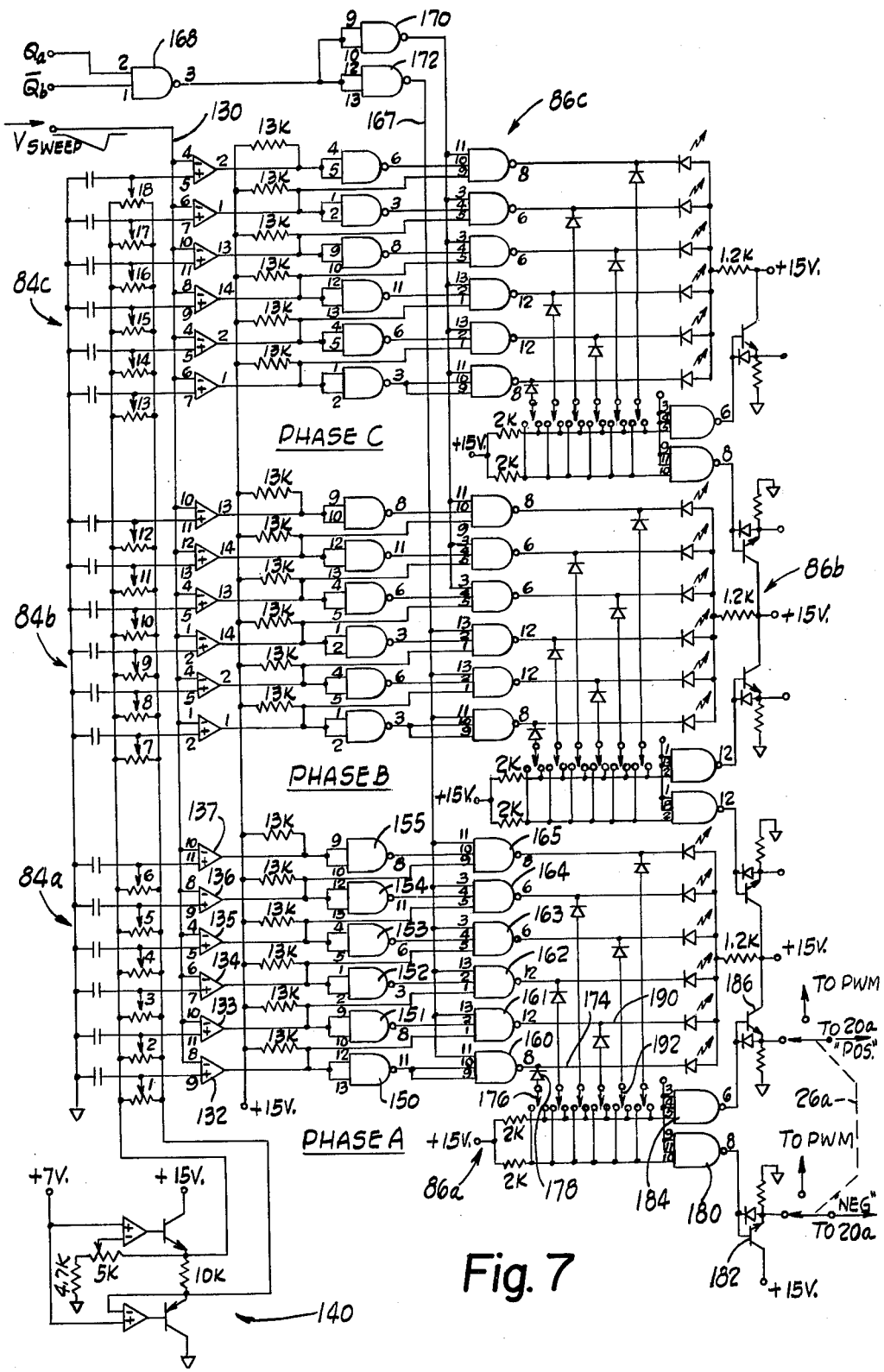
FIG. 7 is a schematic illustration of another section of the system of FIG. 1.

The phase comparator networks 84 and the combinatorial logic units 86 are schematically illustrated in FIG. 7. Only part of the comparator network 84a and its associated logic unit 86a are described because the networks and units for all the motor phases are identical.

The ramp generator 82 is supplied with a starting pulse at a time $T_0$ which results in the transmission of the negative-going sweep voltage to the inverting input of each comparator in the network 84 on a signal bus 130. The first comparator 132 of the network 84a is set to produce an output at a first predetermined voltage level below the level at $T_0$. This occurs at a time $T_1$ in the interval. The second comparator 133 is set to produce an output at a next lower voltage level (at a time $T_2$) and so on, with the comparators set to produce outputs at successively lower voltages.

When the sweep signal is first produced on the bus 130 the output of the comparator 132 is low as are the outputs of all the remaining comparators 133-137. When the sweep voltage level reaches the level at which the comparator 132 is set to respond, the output of the comparator 132 goes high and remains high until the sweep voltage has returned to its initial level. The remaining comparators in the phase A comparator network 84a operate substantially like the comparator 132 and during the period of the sweep voltage they will successively produce outputs.

The output from the phase comparator network 84a is fed to the combinatorial logic unit indicated by the reference character 86a. The combinatorial logic unit includes a series of input inverters 150-155 having their inputs coupled to the respective comparators 132-137. The output of each of the inverters 150-155 is high when the output from its associated comparator is low and, when the associated comparator's output goes high, the inverter output goes low.

The outputs from the inverters 150-155 are connected to the inputs of NAND gates 160-165. The NAND gates 160-165 are gated at $T_0$ by a signal on a bus 167 indicative that a positive output signal is being produced by the flip-flop 92 (i.e., $Q_a$ is being produced) and a negative output from the flip-flop 110 is being produced (indicative that $\overline{Q_b}$ is being produced and the capacitor 96 is not being discharged). These signals are fed to the combinatorial logic system via a NAND gate 168 which produces a negative signal in response only to the presence of both the $Q_a$ signal and the $\overline{Q_b}$ signal. The output from the NAND gate 168 is fed to inverters 170, 172 which invert the NAND gate output and direct the resultant signal to the NAND gates in the combinatorial logic units 86. Thus, whenever the sweep voltage is being generated the NAND gates 160-165 in the phase A combinatorial logic unit 86a are enabled.

The output of the inverter 150 is high from $T_0$ until the time $T_1$ when the output of the comparator 132 goes high. Accordingly, the NAND gate 160 is rendered effective at $T_0$ to produce a negative output signal on the line 174. The line 174 is connected to a three position selector switch 176 through a diode 178. The selector switch 176 is illustrated in an open position in which the fact that the NAND gate 160 provides an output has no effect on the phase A driver circuit 20a, i.e., no voltage is applied across the winding 16a. When the switch 176 is positioned to complete a circuit between the output line 174 and the input of an inverter 180, the output signal from the NAND gate 160 is effective to cause the output of the inverter 180 to go high resulting in an output transistor 182 being rendered conductive and producing an output signal to the driver circuitry 20a for energizing the winding 16a with a "negative" voltage.

When the switch 176 is positioned to connect the line 174 with the input of an inverter 184, the presence of the output signal from the NAND gate 160 on the line 174 causes the output of the inverter 184 to go high rendering an output transistor 186 conductive and producing an output signal to the driver circuit 20a for energizing the winding 16a with a "positive" voltage.

Accordingly, by setting the position of the switch 176 a "positive," "negative," or zero voltage can be applied across the winding 16a.

When the output of the comparator 132 goes high at time $T_1$, the output from the inverter 150 goes low, thus turning off the NAND gate 160. The driver circuit 20a is no longer affected by the NAND gate 160 and associated circuitry. However, the output of the comparator 132 is connected to an input terminal of the NAND gate 161. Thus, when the output of the comparator 132 goes high, the inputs to the NAND 161 are all high and the NAND gate 161 thus produces a negative output on the line 190. The line 190 is coupled to a setting switch 192 which functions like the switch 176 in controlling which, if either, of the inverters 180, 184 produces an output signal in response to a negative output signal from the NAND gate 161.

The NAND gate operation follows the pattern described successively through the phase A combinatorial logic unit resulting in the voltage waveform applied to the motor winding 16a varying between zero and positive and negative values as indicated by FIG. 2 of the drawings and as controlled by the setting of the switches 176, 192, etc.

While a single embodiment of the present invention has been illustrated and described herein in considerable detail, the present invention is not to be considered limited to the precise construction shown. Other constructions can be utilized to practice the invention. For example, the ramp generator, comparator network and logic units could be replaced with a clock and counter system for controlling the motor energizing pulses. Various other adaptations, modifications and uses of the invention may occur to those skilled in the art to which the invention relates and the intention is to cover all adaptations, modifications and uses which fall within the spirit or scope of the appended claims.

We claim:

1. A method of operating a conventional three phase induction motor to produce extremely large starting torque compared to the nominal motor torque comprising:
    (a) providing a motor operating D.C. power supply;
    (b) connecting opposite ends of first, second and third motor windings across the power supply via respective controller circuits each comprising at least one electronic switch for enabling current flow in either direction through an associated motor winding;
    (c) producing asymmetrical noncyclic control signal waveforms for each of said electronic switches to enable individual power supply energization of said first, second and third windings by asymmetrical noncyclic current pulses so that first, second and third magnetic fields generated by said pulses coact with each other to increase said starting torque.

2. A method of operating a conventional three phase induction motor to provide for extremely large motor starting forces compared to the nominal motor force comprising:
    (a) providing a D.C. motor energizing power supply;
    (b) connecting opposite ends of each of first, second and third motor windings across said power supply;
    (c) supplying individual first, second and third power supply waveforms to said respective windings over a predetermined brief interval;
    (d) configuring the first waveform supplied to said first winding such that current initially flows through said first winding to establish a first magnetic field in said motor;
    (e) configuring the second and third waveforms so that current is supplied to said second and third windings after establishment of the first magnetic field to establish second and third magnetic fields reacting with said first magnetic field to create a motive force acting on the moving element of the motor, said first, second and third waveforms configured differently from each other so that said magnetic fields coact to establish larger than nominal motive force.

3. The method claimed in claim 1 further including producing symmetrical cyclic control signal waveforms and controlling each of said respective electronic switches therefrom to effectively operate said motor as a conventional three phase induction motor.

4. The method claimed in claim 2 further comprising supplying fourth, fifth and sixth power supply waveforms to said respective first, second and third motor windings subsequent to said predetermined interval, said fourth, fifth and sixth waveforms each having the same configuration and of a symmetrical, cyclic nature so that the motor is operated as a conventional induction motor.

* * * * *